United States Patent [19]

Cooper et al.

[11] Patent Number: 4,878,691
[45] Date of Patent: Nov. 7, 1989

[54] TRAILER SUSPENSION APPARATUS

[75] Inventors: Herbert E. Cooper, Scottsdale; Josef P. de Fazekas, Fountain Hills; E. Dallas Smith, Scottsdale, all of Ariz.

[73] Assignee: DBX Corporation, Scottsdale, Ariz.

[21] Appl. No.: 172,695

[22] Filed: Mar. 23, 1988

[51] Int. Cl.4 .............................................. B60G 11/26
[52] U.S. Cl. .................................... 280/189; 280/711
[58] Field of Search ............... 280/698, 701, 711, 713, 280/798, 714, 789, 683, 685, 705, 707

[56] References Cited

U.S. PATENT DOCUMENTS

| | | | |
|---|---|---|---|
| 2,507,980 | 4/1950 | Knapp | 280/124 |
| 3,214,047 | 10/1965 | Moye | 214/506 |
| 3,282,603 | 11/1966 | Barth | 280/106 |
| 3,356,386 | 12/1967 | Taylor | 280/789 |
| 3,704,898 | 12/1972 | Schmidt | 280/124 R |
| 3,746,363 | 7/1973 | Borns | 280/124 A |
| 3,773,348 | 11/1973 | Davis | 280/124 A |
| 3,829,118 | 8/1974 | Gouirand | 280/711 |
| 4,032,167 | 6/1977 | Chereda | 280/789 |
| 4,060,145 | 11/1977 | Kingman et al. | 280/43.17 |
| 4,063,611 | 12/1987 | Anderson | 180/119 |
| 4,095,818 | 7/1978 | Smith | 280/789 |
| 4,422,667 | 12/1983 | Perry | 280/705 |
| 4,468,739 | 8/1984 | Woods et al. | 280/707 |
| 4,470,615 | 9/1984 | Scheuerle | 280/702 |
| 4,580,798 | 4/1986 | Roelofs | 280/698 |
| 4,666,181 | 5/1987 | Wegner | 280/711 |
| 4,718,692 | 1/1988 | Raidel | 280/711 |
| 4,736,965 | 4/1988 | Smith | 280/714 |

Primary Examiner—Richard A. Bertsch
Attorney, Agent, or Firm—Woodard, Emhardt, Naughton, Moriarty & McNett

[57] ABSTRACT

Trailer suspension apparatus for increasing the cargo capacity of the trailer. The apparatus includes a U-shaped frame having a transverse structure and upright structures at the ends of the transverse structure. The trailer wheels are disposed in the upright structures with the upright structures being at least in part over the tracks of the wheels. The wheels are resiliently suspended from the upright structures. The transverse structure is positioned beneath the rolling axes of the wheels to permit the trailer body to provide cargo space between the wheels and over the transverse structure.

20 Claims, 6 Drawing Sheets

TRAILER SUSPENSION APPARATUS

TECHNICAL FIELD

This invention is concerned with increasing the cargo carrying capacity of overroad and rail-transported trailers.

BACKGROUND ART

Virtually every commodity in the market today is, at one time or another, transported by truck, often in a tractor-trailer rig. For long distance transport, the trailer, or semi-trailer as it is often called, is frequently carried by a rail car.

It is axiomatic that the larger the cargo space for a fully loaded trailer, the lower the per-mile transportation cost for the transported commodities. There are factors, however, which limit trailer size. Various governmental regulations dictate the maximum dimensions of highway trailers. And, of course, if the trailer is to be transported by rail, the dimensions of the standardized rail car dictate the maximum dimensions of the trailer.

In the most common form of piggyback trailer rail transport, each rail car carries two trailers. The standard rail-transportable trailer has a maximum length of approximately 45 feet, a maximum width of approximately 102 inches, and a maximum height above the ground of approximately 162 inches. For the reasons mentioned above, these dimensions are not to be exceeded. It is, thus, impractical to increase cargo space by increasing the overall dimensions of the trailer.

Heretofore, in most rail-transportable trailers, the floor of the cargo space, i.e., the bottom of the trailer body, is several feet off the ground to clear the rear wheels, axial, and suspension of the tractor and the rearwardly disposed wheels and suspension of the trailer.

The introduction of air-bag suspension systems for tractor-trailer rigs has somewhat reduced the distance between the trailer floor and the road surface required to clear the tractor and trailer suspension systems. But the increase in cargo capacity of trailers so equipped has been quite small. U.S. Pat. No. 3,078,104, granted Feb. 19, 1963, to W. G. Chalmers for "INDEPENDENT REAR SUSPENSION FOR SEMI-TRAILERS", and U.S. Pat. No. 3,140,880, granted July 14, 1964, to L. D. Masser for "SUSPENSION FOR AUTOMOTIVE VEHICLES", show representative pneumatic suspension systems.

It has also been proposed to utilize some of the space between the ground and the bottom of the trailer body by equipping the body with a depending support structure between the wheels of the trailer and the wheels of the tractor to gain auxiliary cargo space. U.S. Pat. No. 3,884,502, granted May 20, 1975, to R. F. Wagner for "SEMITRAILER OR THE LIKE", discloses a trailer with this modification. The disadvantage here is that, although the additional support structure adds cargo space, that space is not in communication with the interior of the trailer and, therefore, does not increase the size of the main cargo compartment. The size of commodities that can be carried remains restricted.

Another approach to increasing the cargo capacity of trailers has been the use of the so-called "drop frame" for the trailer body. In this construction, the floor of the cargo compartment is dropped close to the road surface between the suspension apparatus of the tractor and the suspension apparatus of the trailer and also possibly for a short distance to the rear of the trailer suspension. Again, the cargo capacity has been increased, but there are shortcomings to this design. Principal among these is the hump, or rise, in the floor of the cargo compartment required to clear the wheels, axles, and suspension components of the trailer. This makes it impossible to load the trailer with a forklift truck through the rear door of the trailer from a conventional loading dock. The addition of doors to the sides of the trailers, of course, increases the cost of the trailer, and those doors often are not accessible from the loading dock.

U.S. Pat. No. 4,619,578, granted Oct. 28, 1986, to J. H. Routledge for "RETRACTABLE WHEEL SUSPENSION APPARATUS", discloses an interesting arrangement for utilizing the space between opposite wheel assemblies of a container carrier. The tractor disclosed in that patent pulls a horizontally disposed, U-shaped frame which is open at the rear so that the frame can be backed under and around a container. The two legs of the frame are supported by pneumatic suspension systems whereby the wheels of one leg are suspended independently of the wheels on the opposite leg. Because there are no through-axles between the wheels on one frame leg and the wheels on the other leg, the space between the opposite wheels can be occupied by the cargo container. The system disclosed in the Routledge patent is simply too complex and too expensive to be utilized on the common transport trailer.

There continues to be a need, therefore, for trailer suspension apparatus which will permit the floor of the trailer body to be lowered closer to the roadway surface and to be substantially flat from the rear of the trailer through the wheel region of the trailer.

SUMMARY OF THE INVENTION

This invention utilizes a U-shaped frame, but the frame is formed of a transverse structure and upright structures at the ends of the transverse structure so that the frame is open at the front, the rear, and the top. The trailer wheels and the resilient suspension system for each wheel are disposed within the upright structures of the frame so that the upright structures lie essentially above the tracks of their respective wheels. The transverse structure of the frame is disposed beneath the axes of the wheels and close to the roadway surface to permit the body of the tractor to provide cargo space between the trailer wheels.

BRIEF DESCRIPTION OF THE DRAWINGS

The invention is described in greater detail hereinafter by reference to the accompanying drawings wherein.

BEST MODE FOR CARRYING OUT THE INVENTION

Figures 1, 2:
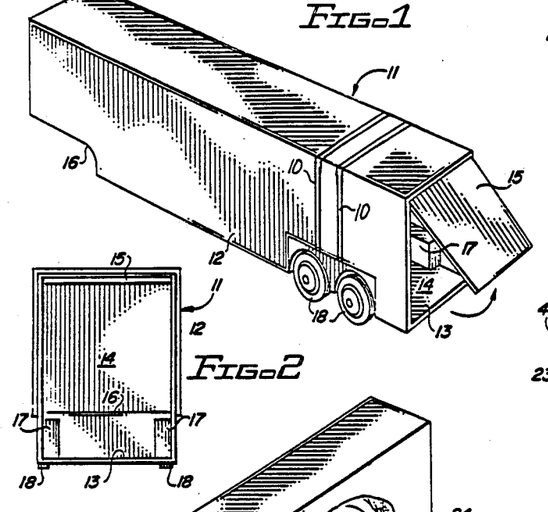
FIG. 1 is a three-quarter perspective view from above of a semi-trailer constructed in accordance with this invention.
FIG. 2 is a rear view of the trailer with the rear door raised to an open position.

FIGS. 1 and 2 illustrate a large cargo capacity configuration for a trailer, preferably a semi-trailer, which can be achieved by this invention. The trailer is identified generally by reference numeral 11. The trailer body 12 is characterized by having the floor 13 of cargo space 14 therein quite low and close to the surface of the roadway, e.g., eight to eleven inches from the roadway. Access to the cargo space 14 is provided by a door 15 at the rear of the trailer. The trailer body 12 is further characterized in that the floor 13 is substantially flat and continuous from the rear of the trailer to the step-up 16 at the front of the trailer which accommodates the fifth wheel assembly of a tractor (not shown).

The floor 13 of trailer 11 narrows somewhat where the body 12 is provided with wheelwells 17 to house the wheels 18 and their associated suspension apparatus. It is characteristic of a trailer 11 constructed in accordance with this invention, however, that the floor 13 is substantially flat and continuous up to the step-up 16 and is positioned very close to the roadway surface and beneath the axes of the wheels 18. Compared to the conventional trailers used for road and rail transport, the floor disposition of the trailer of this invention results in as much as a twenty-five percent increase in volume of the cargo space 14. And, all of that space can be loaded with a forklift truck entering the space 14 from the rear of the trailer and running on the flat floor 13.

The suspension apparatus which enables these results to be achieved are illustrated in one embodiment of the invention shown in FIGS. 3 through 6. One of the principal components of the suspension apparatus is a U-shaped frame 19 comprising a transverse structure 20 and two upright, or upstanding, structures 21 at the sides of the transverse structure. The frame 19, it is to be noted, is open at the top and at both its front and rear ends to form a saddle in which the trailer body 12 fits. The trailer body 12 is constructed around and securely affixed to the frame 19 in the wheelwell regions 17 of the body.

Figure 3:
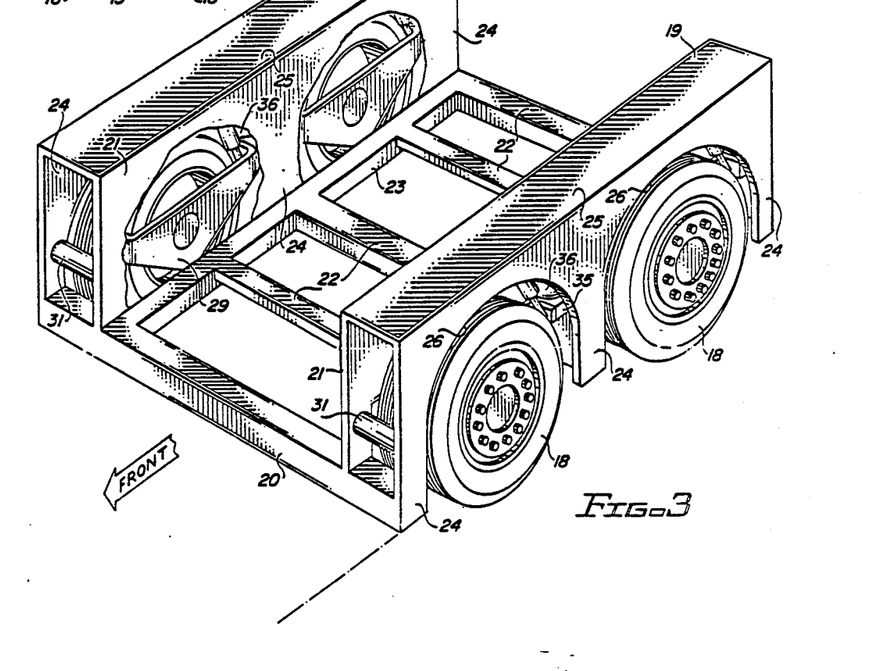
FIG. 3 is a three-quarter perspective view from above of the principal components of one embodiment of the trailer suspension apparatus of this invention.

Frame 19 must be of sturdy construction because it is required to independently suspend at least two, and for many applications four or six, wheels 18. To provide the required strength and rigidity for frame 19, while keeping the weight of the apparatus to a minimum, use can be made of tubular or hollow components. For example, the transverse structure of the frame 19 is preferably fabricated of transverse tubular members 22 and longitudinal tubular members 23 which are welded together to provide a strong, but light, structure. The hollow interior of one or more of the members 22 and 23 may, if desired, be used for storage of compressed air for purposes which are described hereinafter. To provide the required strength for trailer body 12, one or more belts 10 of reinforcing bar preferably extend from one side of frame 19, up one side of trailer body 12, across the top, and down the other side to the other side of frame 19. The reinforcing bar belts are welded or bolted to frame 19 to form an integral structure therewith.

Each upright structure 21 of frame 19 is also fabricated to provide strength with light weight. Structures 21 have vertical support members 24 positioned ahead of and behind each wheel 18, and these members are joined by horizontal support members 25 extending above wheels 18. The construction of each upright structure 21 is such as to provide openings 26 therein for the wheels 18.

Figure 5:
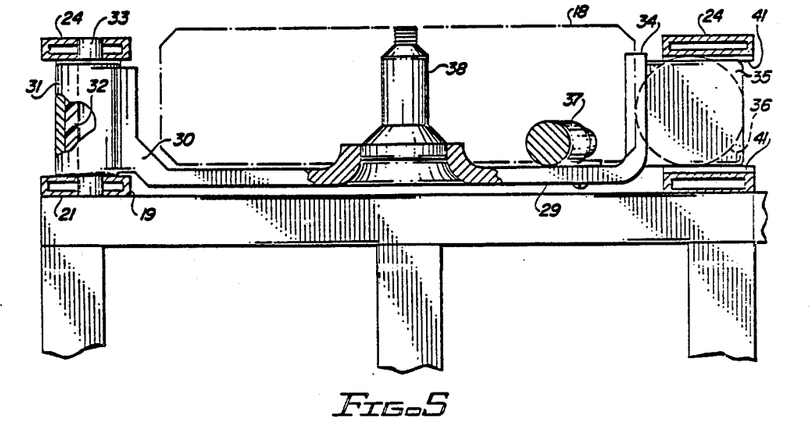
FIG. 5 is a horizontal sectional view through a portion of the apparatus shown in FIG. 3.

As best shown in FIGS. 3 and 5, all of the members making up the upright structures 21 are disposed, at least in part and, preferably, almost entirely, above the tracks of the wheels on the road surface. In other words, the transverse extent of each upright structure is little more than the transverse extent of the wheels 18 therein. As such, the upright structures 21 of frame 19 constitute minimum encroachment into the cargo space 14, thus maximizing the volume of cargo space.

Figure 4:
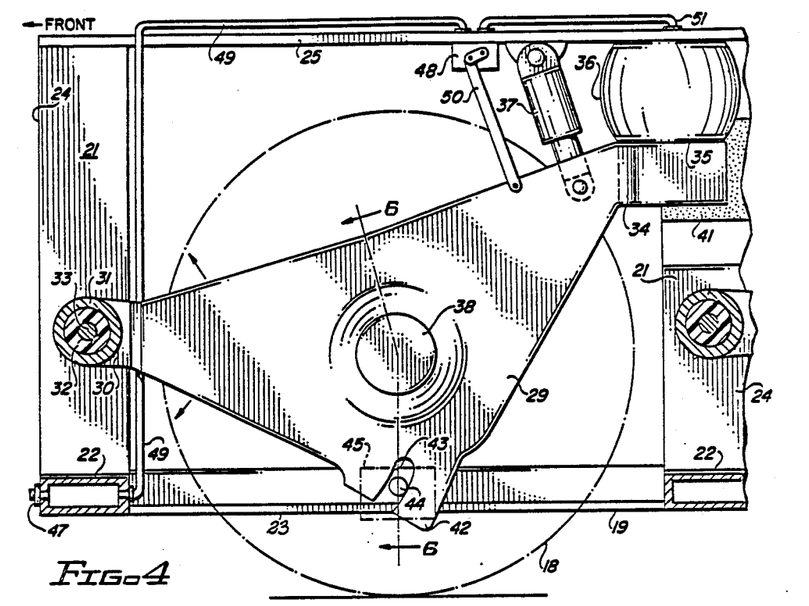
FIG. 4 is a vertical sectional view through a portion of the apparatus shown in FIG. 3 and illustrating suspension apparatus for one wheel of the trailer.
Figure 6:
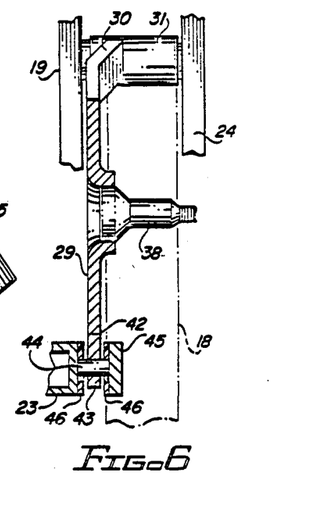
FIG. 6 is a fragmentary sectional view taken generally as indicated by the line 6—6 in FIG. 4.

Each wheel 18 is resiliently and independently suspended within one of the upright structures 21 of frame 19. Pneumatic suspension means are preferably employed and the means for suspending one wheel is illustrated in FIGS. 4, 5, and 6. The suspension means includes a preferably triangular trailing suspension arm 29 which is pivotally supported at its forward end 30 in one of the vertical support members 24 of upright structure 21. The pivotal support means comprises a cylindrical sleeve 31 affixed to the forward end 30 of arm 29 and containing an elastomeric bushing 32 surrounding a pin 33 passing through support member 24.

The opposite, or rear, end 34 of trailing support arm 29 has a flat air-bag platform 35 formed thereon to engage an air bag 36 secured by means, not shown, between platform 35 and the horizontal support member 25 above the wheel 18. The suspension means also preferably includes a shock absorber 37 attached to the rear end 34 of trailing support arm 29 and to the underside of horizontal support member 25.

Intermediate the ends 30 and 34 of trailing support arm 29 there is provided a spindle, or stub axle, 38 for rotatably supporting a wheel 18. When wheel 18 rolls over rough or uneven terrain, the trailing support arm 29 carrying that wheel pivots about pin 33 and compresses air bag 36. Air bag 36 and shock absorber 37 absorb the forces acting on the wheel so they are not transmitted to the trailer body 12 and its contents.

It will be noted, as best shown in FIG. 5, the middle region of trailing arm 29 is offset from the ends thereof so that the pivot sleeve 31, the wheel 18, and the air bag 36 for each suspended wheel are in substantial alignment, in that order. This alignment substantially eliminates any transverse or twisting forces being applied to the arm 29 when roadway-generated forces are applied to wheel 18. It is desirable, nevertheless, to stabilize the trailing arm 29 against transverse movement. Two mechanisms are incorporated into the suspension apparatus for this purpose.

The first mechanism for limiting transverse movement of the rear end 34 of the trailing arm 29 involves a pair of guide pads 41 mounted on a vertical support member 24. Pads 41 are in close proximity to the sides of air-bag platform 25 and are engaged by the platform if the rear end of the trailing arm 29 undergoes any transverse movement. Pads 41 are preferably made from a tough, slippery plastic material, such as polytetrafluorethylene. This mechanism effectively limits transverse movement of arm 29 about a vertical axis on elastomeric bushing 32.

The second mechanism for limiting transverse motion of trailing arm 29 resists any forces tending to twist the trailing arm about a horizontal axis on elastomeric bushing 32 as the semi-trailer turns. Trailing arm 29 is provided with an extension 42 projecting downwardly therefrom in an intermediate region beneath wheel-supporting spindle 38 (see FIGS. 4 and 6). Arm extension 42 has an arcuate slot 43 formed therein to receive a pin 44 carried on a longitudinal tubular member 23 of the frame transverse structure 20. This slotted portion of arm extension 42 is closely confined between tubular member 23 and a stop plate 45 secured to pin 44 at the opposite face of the extension. If desired, that portion of member 23 likely to contact arm extension 42 and the interface of stop plate 45 can be provided with guide pads 46 also made of plastic material It was mentioned above that if the frame 19 is constructed of hollow tubular members, those members can be utilized as compressed-air storage vessels for the pneumatic suspension system. How this is accomplished is illustrated somewhat diagrammatically in FIG. 4. Air under pressure from a compressor (not shown) is fed into a hollow, transverse tubular member 22 through an inlet 47. Air stored in member 22 is conveyed to a valve 48 via a line 49. Valve 48 senses the position of trailing support arm 29 in relation to the frame 19 by means of a linkage 50 and is opened to admit additional air to air bag 36 through line 51 whenever the trailer body 12 is riding too low. Of course, in order to provide sufficient air storage capacity, it may be necessary to utilize a number of hollow members making up the frame 19.

Figure 7:
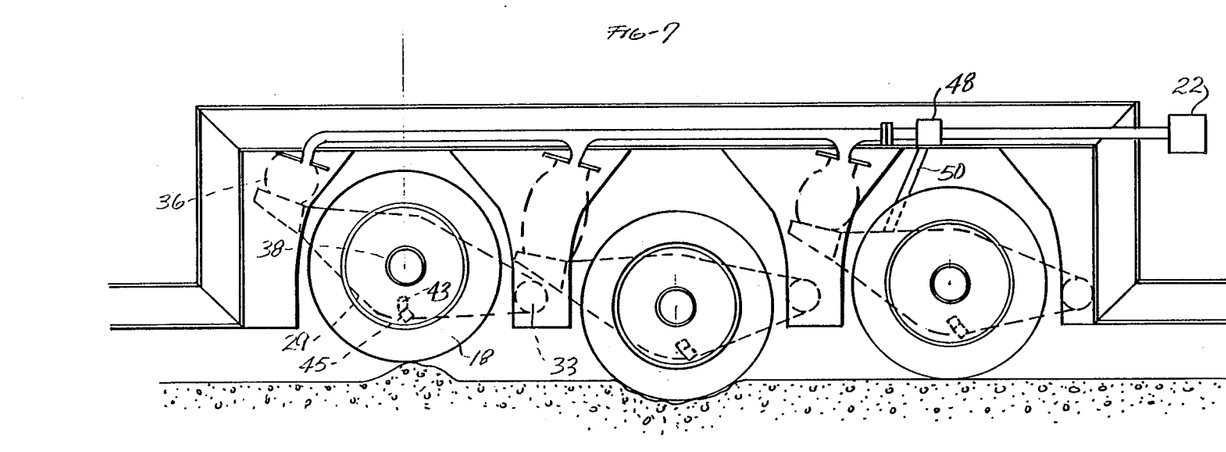
FIG. 7 is a simplified side view of the rear of a semi-trailer illustrating another embodiment of the invention.
Figure 8A:
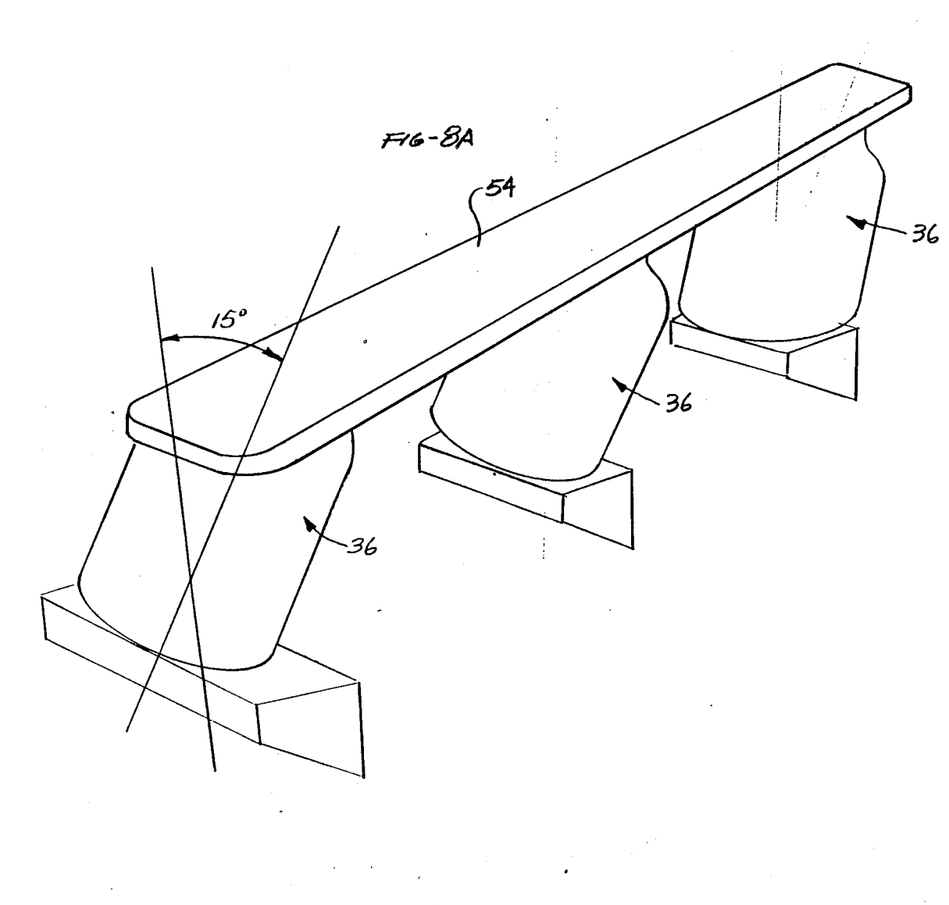
FIGS. 8A to 8C are diagrams of the details of the air bags and the interconnecting conduit of FIG. 7.
Figure 8B:
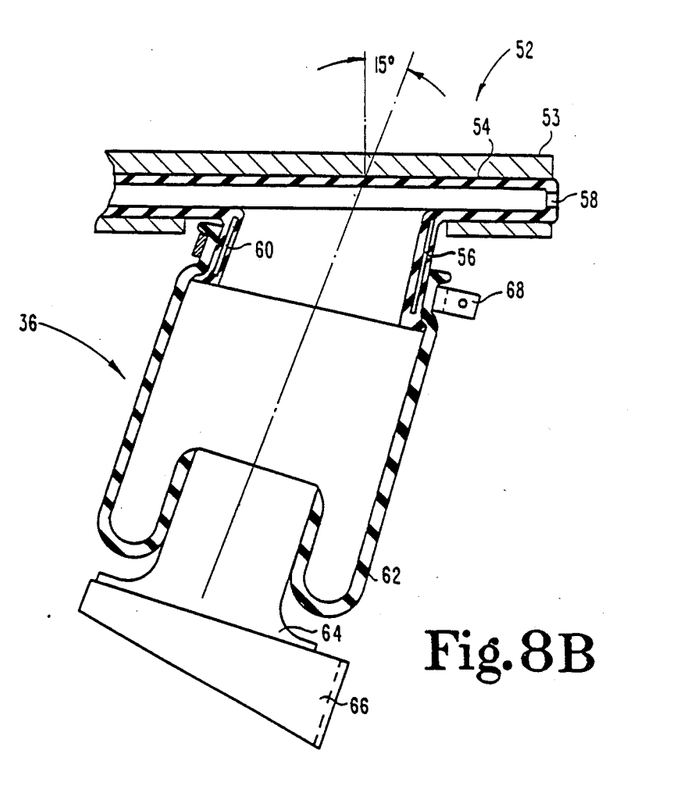
Figure 8C:
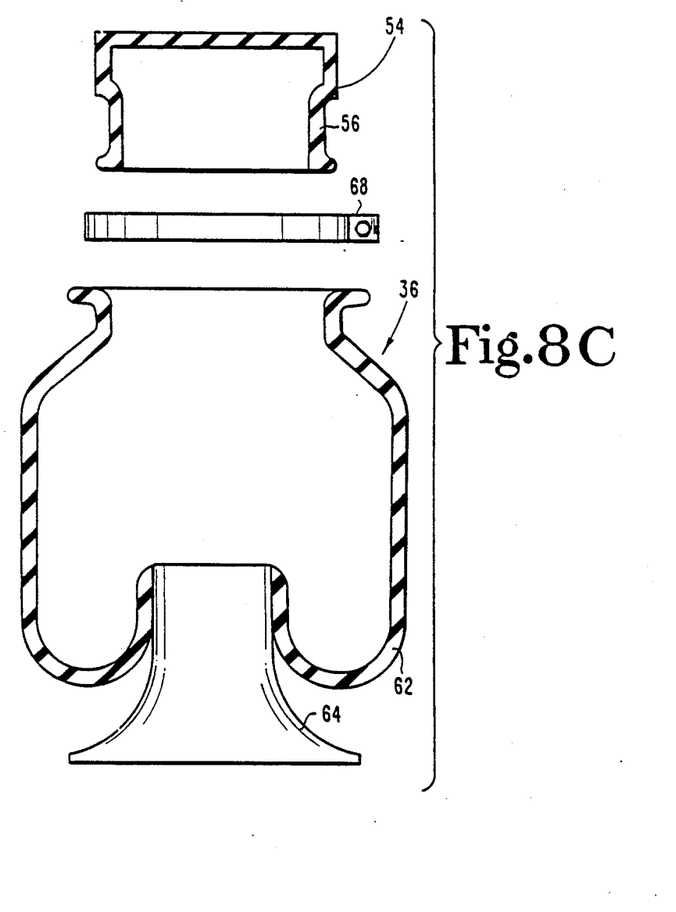

Another embodiment of the invention is shown in FIGS. 7 and 8. In this embodiment, air bags 36 for the respective wheels 18 (three in number in this embodiment) are interconnected by a pressure equalizing conduit 52. In contrast to the conduits that have interconnected wheel suspension air bags in the prior art, conduit 52 has a very large cross section. Specifically, the cross section is sufficiently large to transfer air from one air bag to the other as the wheels ride over bumps or holes in the roadway to equalize dynamically the pressure in the air bags and keep the wheels in contact with the surface of the roadway independent of trailer body 12. Thus, the minimum cross section is dependent upon the spacing between wheels 18 and the maximum speed of the trailer. More particularly, the minimum cross section is sufficiently large that the pressure of the air bags equalizes in a time interval less than the distance between wheels divided by the trailer speed. Thus, if the wheels are spaced five feet apart, and the trailer speed is 100 feet per second, the time interval would be less than 50 milliseconds, and preferably 5 milliseconds or less. This ensures that equal force is exerted on the wheels as they individually traverse irregularities in the roadway.

As depicted in FIG. 8A, conduit 52 is horizontally elongated and air bags 36 extend downwardly therefrom at a given angle, e.g., 15°. As presently advised, a typical cross section for conduit 52 is a 5¾ in. width by a 1½ in. height. As depicted in FIG. 8B, conduit 52 is constructed in two pieces — an outer rigid tube 53 made of steel or plastic and an inner elastomeric bladder 54. Tube 53 contains and prevents the expansion of bladder 54. At intervals corresponding to the spacing between air bags 36, collars 56 extend downwardly from bladder 54 in a one-piece molded construction therewith. A female fitting 58 is molded into one end of bladder 54 for connection to air supply 20 which has a connecting male fitting, and a steel support ring 60 is molded into collars 56 (at the given angle, e.g., 15°). Air bags 36 each comprise a flexible elastomeric pouch 62 open at one end and secured to a retaining piston 64 at the other end. Piston 64 is attached to a mounting bracket 66. The neck of member 62 at its open end surrounds collar 56 and is secured thereto at ring 60 by a hose clamp 68. Air bags 36 are similar to commercially available air bags, such as Goodyear Model 1R10-045.

In the embodiment of FIGS. 7 and 8A to 8C, valve 48 is located between the air supply, i.e., member 22, and conduit 52 so the air pressure in air bags 36 is adjusted to maintain trailer body 16 at the same height from the surface of the roadway, e.g., 8 to 11 inches, irrespective of the load carried by the trailer. Specifically, the embodiment of FIG. 4 could be modified to connect line 51 to female fitting 58 of bladder 54, instead of directly to air bag 36.

From the foregoing, it should be apparent that this invention makes it possible to significantly increase the cargo-carrying capacity of a standard trailer without increasing the overall dimensions of the vehicle.

We claim:

1. A wheel suspension apparatus in which the wheels on opposites of a vehicle are independently suspended, comprising:
   a U-shaped frame having a transverse structure and upright structures carried at the ends of the transverse structure, said upright structures having downwardly-facing open regions therein;
   wheels disposed in said open regions and having rolling axes, said upright structures being disposed respectively at least in part above the tracks of said wheels, said transverse structure connecting said upright structures and being disposed beneath the rolling axes of said wheels; and
   means for suspending each of said wheels, respectively, on said upright structures and movable vertically with respect to said upright structures and independently movable vertically relative each other.

2. The apparatus of claim 1 in which said suspending means includes for each wheel a substantially flat wheel plate having a first side and a second side the wheel plate being movable vertically between uppermost and lowermost positions, means located on the second side of the wheel plate for pivotally mounting the wheel plate to one of the upright structures with the first side facing the transverse structure, means for rotatably mounting the wheel to the second side of the wheel plate, and biasing means located on the second side of the wheel plate for biasing the wheel plate to an intermediate position between the uppermost and lowermost positions.

3. The apparatus of claim 2 in which said pivotally mounting means is for mounting said wheel plate with a pivot axis positioned above the transverse structure.

4. The apparatus of claim 2 in which said biasing means for each wheel plate includes an air acting between the wheel plate and the upright structure.

5. The combination with the trailer suspension apparatus of claim 4 of a trailer body, said body being secured to said frame and being constructed to provide cargo space therein above said transverse frame structure and between said upstanding frame structures.

6. The apparatus of claim 4 and which further includes means for interconnecting the air bags to equalize the pressure therebetween as the wheels trasverse surface irregularities.

7. The system of claim 6, in which the interconnecting means comprises a conduit having a cross section sufficiently large to equalize the pressure in the air bags in a time interval less than the distance between the wheels divided by the trailer speed.

8. The system of claim 6, in which the interconnecting means comprises a conduit having a cross section sufficiently large to equalize the pressure in the air bags in a time interval less than 100 milliseconds 9. The apparatus of claim 1 in which each of said upstanding structures has vertical support members positioned ahead of and behind its respective wheel and a horizontal support member positioned above its respective wheel, each of said horizontal support members being positioned above at least a portion of the track of its wheel.

10. A wheel suspension apparatus in which the wheels on opposite sides of a vehicle are independently suspended, comprising:
a U-shaped frame having a transverse structure and upright structures carried at the ends of the transverse structure, said upright structures having downwardly-facing openings thereon;
wheels disposed in the open regions of the upright structures, the upright structures being disposed respectively at least in part above the tracks of said wheels, said wheels having rolling axes and the transverse structure being disposed beneath the rolling axes of said wheels;
a pair of trailing suspension arms having front and rear ends;
pivot means for pivotally supporting each of said arms at its forward end on said upright structure with its rear end being movable vertically between uppermost and lowermost positions, said pivot means being disposed in a region above the track of said wheel;
biasing means for separately biasing each said suspension arm in an intermediate position between the uppermost and lowermost positions, said biasing means being disposed between the rear ends of said arms and said upright structure, said biasing means being disposed in a region above the track of said respective wheel; and
a spindle on each said arm intermediate its ends for rotatably carrying each said wheel.

11. The apparatus of claim 10 further comprising guide means carried by said frame in close proximity to each of said trailing arms for confining movement of each arm in a direction at right angles to its direction of movement about its pivot means.

12. The apparatus of claim 11 further characterized in that each said trailing arm has a slot therein and said guide means comprises a guide pin disposed in said slot.

13. The apparatus of claim 10 further characterized in that said biasing means includes for each said suspension arm an air bag disposed in a region above the track of said respective wheel between the rear ends of said arms and said upright structure, said frame is comprised of at least one hollow member adapted to store air under pressure therein and the apparatus further includes means for conveying compressed air from said hollow member to each said air bag.

14. The apparatus of claim 10 wherein said pivot means comprises as elastomeric bushing between said trailing arm and said upright structure.

15. The trailer suspension apparatus of claim 10 wherein the vertical support member positioned behind the wheel includes means adapted to engage a rear end portion of said trailing arm to limit transverse movement of said arm.

16. The trailer suspension apparatus of claim 10 further comprising guide means carried by said frame in close proximity to said trailing arm intermediate its ends for confining movement of the arm in a direction at right angles to its direction of movement about its pivot means.

17. The apparatus of claim 10 in which said pivot means is for supporting each of said arms for pivoting about a pivot axis positioned above the transverse structure.

18. The combination with the trailer suspension apparatus of claim 17 of a trailer body, said trailer body being secured to said frame and being constructed to provide cargo space therein above said transverse frame structure and between said upstanding frame structures.

19. The apparatus of claim 10 in which said biasing means for each wheel plate includes an air bag acting between the wheel plate and the upright structure.

20. The apparatus of claim 10 in which each of said upstanding structures has vertical support members positioned ahead of and behind its respective wheel and a horizontal support member positioned above its respective wheel, each of said horizontal support members being positioned above at least a portion of the track of its wheel.

* * * * *